United States Patent [19]
Steels et al.

[11] 3,770,358
[45] Nov. 6, 1973

[54] BISCUIT FORMING MACHINE
[75] Inventors: Gordon Steels; Stanley Graham, both of Peterborough, England
[73] Assignee: Baker Perkins Limited, Peterborough, England
[22] Filed: Jan. 10, 1972
[21] Appl. No.: 216,498

[30] Foreign Application Priority Data
Jan. 14, 1971  Great Britain ..................... 1,952/71

[52] U.S. Cl. ................. 425/291, 425/164, 425/304
[51] Int. Cl. ............................................ A21c 11/04
[58] Field of Search ................... 425/281, 289, 302, 425/303, 304, 362, 367, 164, 291; 83/6, 7, 8, 9, 10, 11, 2, 660, 678, 300, 100, 404, 301; 99/333, 373, 430

[56] References Cited
UNITED STATES PATENTS
2,019,499  11/1935  Maher ................................. 83/8 X
2,561,231  7/1951  Rose ................................ 83/300 X
2,713,833  7/1955  Fay ..................................... 425/385
3,120,777  2/1964  Genin ............................. 83/678 X
2,678,493  5/1954  Edmunds, Jr. ...................... 425/291

Primary Examiner—Robert D. Baldwin
Assistant Examiner—David S. Safran
Attorney—Roberts B. Larson et al.

[57] ABSTRACT

A machine for forming repetitively impressioned dough sheets with transverse and longitudinal perforations for the manufacture of Soda Crackers wherein a continuous sheet of dough is impressed with the longitudinal and transverse perforations by a marking roll co-operating with a backing roll and the continuous sheet is cut by a knife rotating in phase with the marking roll along selected transverse rows of perforations by moving the backing row towards the knife at appropriate intervals.

9 Claims, 5 Drawing Figures

3,770,358

PATENTED NOV 6 1973

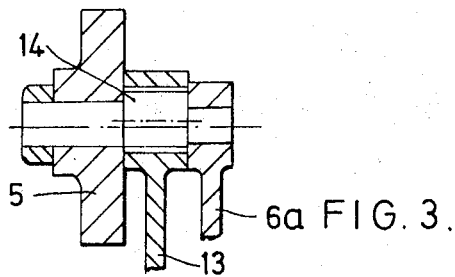
FIG. 3.
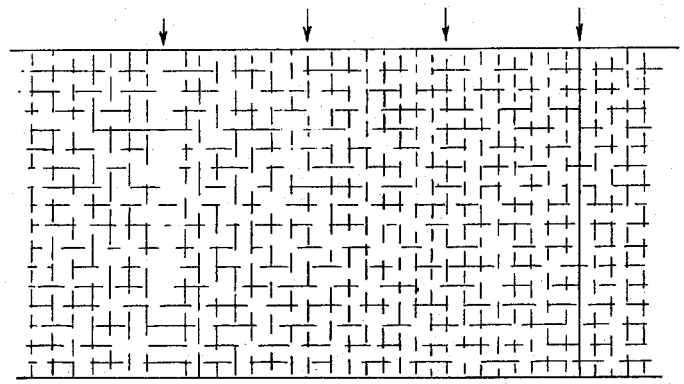
FIG. 4.
FIG. 5.
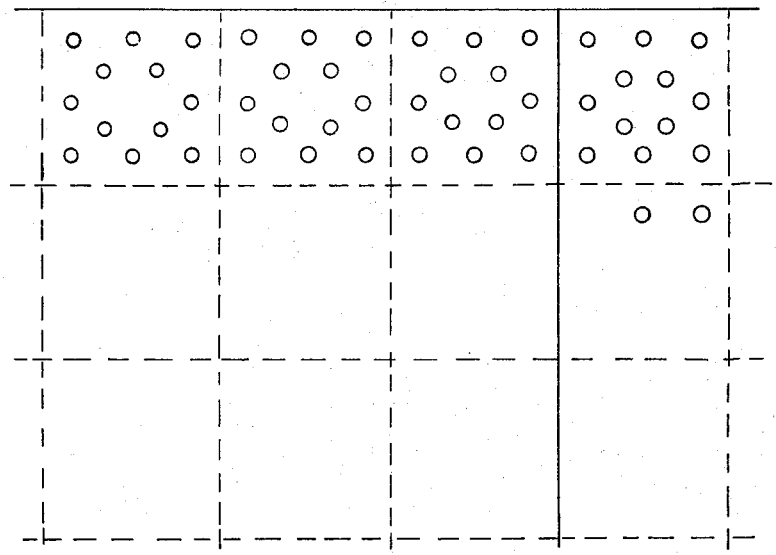

BISCUIT FORMING MACHINE

This invention relates to a biscuit forming machine particularly suitable for the production of biscuits known as "Soda Crackers" or sometimes called "American Crackers" or "American Type Crackers."

Soda crackers are square cut biscuits usually about 50 mm square and are formed from a sheet of dough which is firstly sheeted from bulk and then laminated before a final sheeting through a series of gauging rolls to a final thickness of about 1 mm. The biscuits are normally baked in a high temperature oven for about 2 minutes, it being desirable for them to be abked to a uniform colour. Exposed edges tend to become over-coloured in a high temperature oven and to minimise this edging effect soda crackers are normally baked in sheets each of which are longitudinally and transversely perforated to define rows of individual biscuits. On exit from the oven the sheets are broken along the perforations into individual biscuits.

Because of dough piece shrinkage during baking, to prevent a sheet breaking up in irregular fashion, it is usual to pre-cut the perforated sheets transversely to a particular size before baking, for example at intervals of about 1.2 metres or every 24th row so that during baking the sheets can contract in one piece without irregular breaks.

It is an object of the present invention to provide a machine for forming repetitively impressioned or marked sheets of predetermined length from a continuous sheet of dough.

The invention provides a machine for forming repetitively impressioned or marked dough sheets of predetermined length from a continuous sheet of dough comprising a belt for carrying the continuous sheet of dough between a backing roll and an impression or marking roll to repetitively mark the sheet and between the or another backing roll and a continuously rotatable cutting knife, the knife being adapted to approach the dough sheet during each revolution of the knife and to form transverse cuts in the dough sheet during selected revolutions of the knife by relative movement of the backing roll and knife axes towards each other.

For the production of soda crackers, the impression or marking roll is provided with axially spaced circumferentially extending serrated blades for forming longitudinal rows of perforations in the dough sheet, with circumferentially spaced, axially extending serrated blades for forming transverse rows of perforations in the dough sheet, and with suitably located docker pins.

In one form of machine according to the invention, one of the axially extending serrated blades of the marking roll is omitted, so that the transverse set of perforations is omitted from the dough sheet for each revolution of the marking roll. In this arrangement the rotary knife is serrated and rotated in phase with the marking roll to provide a missing set of transverse perforations with each revolution of the knife, the backing roll and knife being moved towards one another on say each third revolution of the knife so that the sheet is cut on these revolutions along a line of missing perforations.

In an alternative form of machine, the marking roll is provided with a full complement of axially extending blades, to form transverse perforations at a regular pitch, and the cutting knife is arranged to clear the dough sheet during all revolutions except when a transverse cut is required, when it operates along a line of already formed perforations by relative movement of the knife and backing roll.

The invention will now be described by way of example with reference to the accompanying drawings, in which:

FIG. 3 is a sectional view on line III—III of FIG. 2,

FIG. 4 is a plan view of a dough sheet being processed, and

FIG. 5 is an enlarged plan view of a part of the dough sheet.

Figure 1:
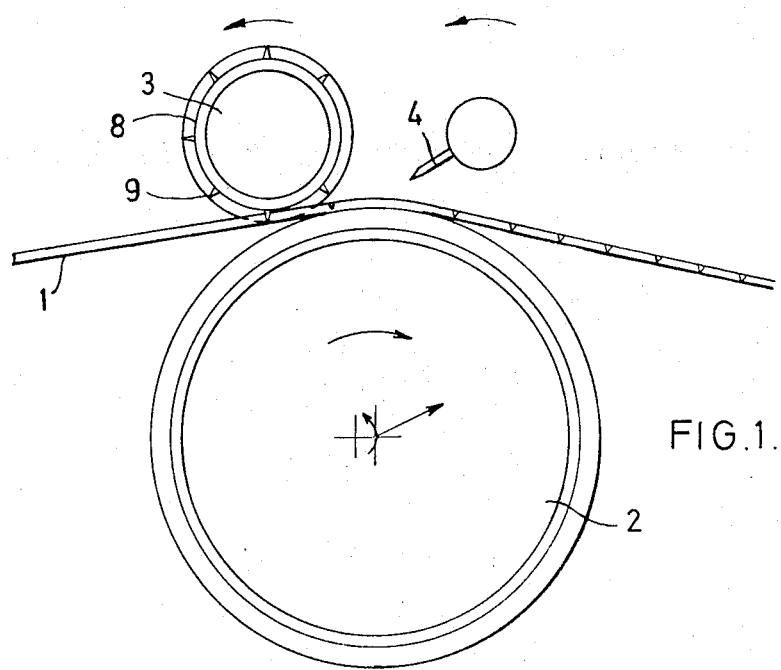
FIG. 1 is a diagrammatic side view of a part of a soda cracker forming machine.
Figure 2:
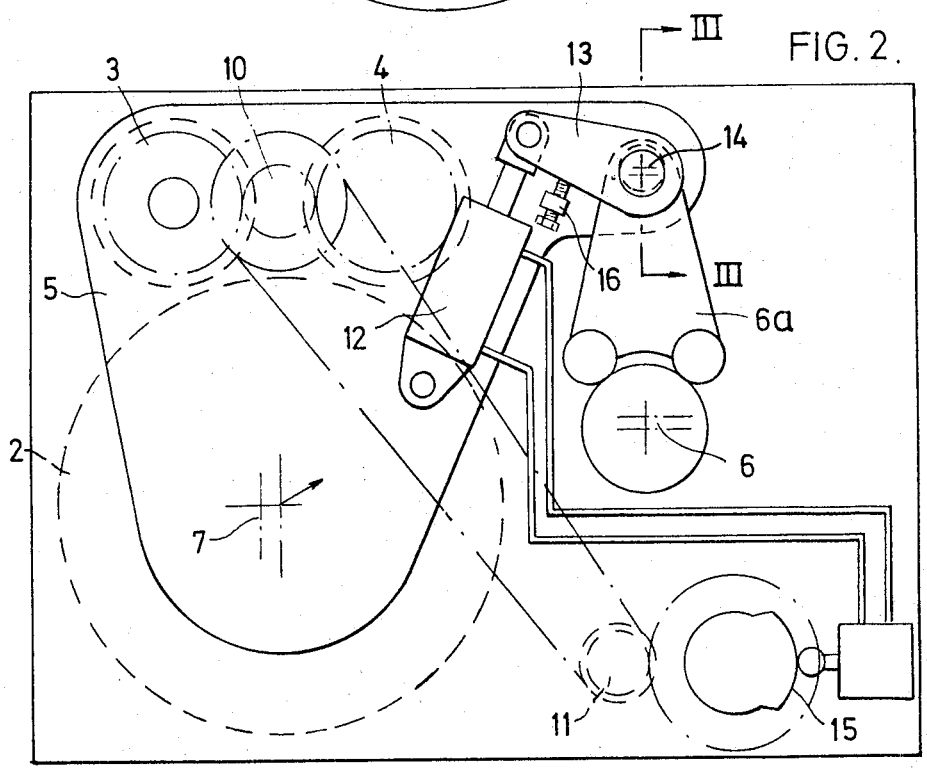
FIG. 2 is a diagrammatic side view of the complete machine.

The machine illustrated comprises an endless travelling belt 1 for conveying a continuous dough sheet between a backing roll 2 and a marking roll 3, and between the backing roll and a rotary cutting knife 4. The marking roll and cutting knife are rotatably mounted on fixed axes in side plates of the machine, but the backing roll (which is rubber covered) is freely rotatably mounted on a swinging frame 5 which can swing about the axis of the marking roll. The backing roll is mounted in eccentric housings 7 retained in swinging frame 5 so that the centres of the marking roll and the backing roll are adjustable to each other to affect the depth of marking.

The swinging frame 5 which pivots about the marking roll centre is adjusted by eccentric 6 through link 6a to adjust the distance between the axis of the cutting knife and the backing roll and so affect the depth of cut without affecting the depth of marking. In operation, the backing roll is frictionally rotated by the moving belt.

The marking roll is provided with docker pins (not shown) with axially spaced, circumferentially extending serrated blades 8, and with seven axially extending serrated blades 9 circumferentially spaced apart at 45 degree intervals so that a 90 degree gap is left between one pair of blades as shown. By this arrangement the marking roll impresses the dough sheet with continuous longitudinal rows of perforations and seven equally interspaced rows of transverse perforations with a double space being left between the succeeding pair of transverse rows. The missing row of perforations is provided by the knife (also serrated) and which is driven in phase with and at the same speed as the marking roll by a common pinion 10 from a driven layshaft 11. Thus each eighth transverse row of perforations is formed in the double space by the rotating knife.

Further, an arrangement is provided to lift the swinging frame and backing roll about 0.5 mm towards the knife on each third revolution of the knife so that every third operation of the knife (i.e. every 24th biscuit row) will cause the dough sheet to be cut through instead of simply forming a missing row of perforations. To this end, a pneumatic cylinder 12 anchored on swing frame 5 of the machine is provided for lifting the swinging frame through a lever 13 and a third eccentric 14, the cylinder being operated by a cam 15 driven by layshaft 11 at one third the speed of the marking roll and knife. The timing of the cam is not critical provided the swinging frame is lifted at any time during the revolution of the knife immediately preceding a cut and lowered at any time during the revolution of the knife immediately succeeding the cut. It will be appreciated that the speed of the cam relative to the speed of the marking roll and knife determines the length of the cut dough pieces in multiples of eight biscuit rows.

A stop 16 ensures that the down position of the swinging frame is positive and limits the travel of the pneumatic cylinder and during cutting strokes of the knife, the eccentric 14 is at top dead centre to prevent cutting forces being taken directly on the pneumatic cylinder. In an alternative arrangement to that shown, the stop may be used as a point at which the load supplied by the piston of cylinder 12, through lever 13 bearing against the stop causes the frame 5 to swing up into the cutting position. The cutting forces are then taken directly by the pneumatic cylinder.

The eccentrics 6 and 7 can be adjustable for example by hand wheel-operated wheel and worm devices so that the machine can be set up to produce different kinds of biscuits requiring different diameters for the cutting roll and knife roll.

We claim:

1. A machine for forming repetitively impressioned dough sheets of predetermined length from a continuous sheet of dough comprising a belt for carrying a continuous dough sheet, backing roll means in contact with an undersurface of the belt, an impression roll above the belt, axially extending serrated blades on the marking roll for repetitively marking the sheet by rotation of said roll, said blades being interspaced by gaps, all but one of said gaps being equal with the unequal gap being twice the size of the others to produce equally interspaced transverse rows of perforations in the dough sheet with one row of perforations being omitted for each revolution of the marking roll, a transverse serrated rotary knife above the belt downstream of the marking roll, means for rotating the knife in phase with the unequal gap of the marking roll to produce one of said omitted rows of perforations in the dough sheet for each revolution of the knife, and means for relatively moving the backing roll means and the knife towards one another during selected revolutions of the knife to cut the dough sheet along a row of said omitted perforations.

2. The machine of claim 1 including axially spaced circumferentially extending serrated blades on the marking roll for forming longitudinal rows of perforations in the dough sheet.

3. The machine of claim 1 wherein the backing roll means comprises a single backing roll.

4. The machine of claim 3 including means for moving the backing roll towards the knife to provide the relative movement between the backing roll and the knife without affecting the distance between the backing roll and the marking roll.

5. The machine of claim 4 wherein the marking roll and cutting knife have fixed axes and the backing roll is mounted on a swinging frame for pivotal movement about the axis of the marking roll towards and away rom the cutting knife.

6. The machine of claim 5 wherein a cam-operated piston and cylinder assembly is provided for pivoting the tilting frame to move the backing roll towards the cutting knife during said selected revolutions of the knife.

7. The machine of claim 6 wherein a common suitably phased drive means is provided for rotating the marking roll, the cutting knife and the cam.

8. The machine of claim 5 wherein the backing roll has an eccentric mounting in the swinging frame so that the distance between the backing roll and the marking roll can be adjusted.

9. The machine of claim 5 wherein the swinging frame has an eccentric mounting to enable the distance between the backing roll and the knife to be adjusted without affecting the distance between the backing roll and the marking roll.

* * * * *